United States Patent [19]

Urbutis

[11] Patent Number: 4,690,173

[45] Date of Patent: Sep. 1, 1987

[54] SHIRRED CASING ARTICLE

[75] Inventor: Algimantas P. Urbutis, Palos Heights, Ill.

[73] Assignee: Viskase Corporation, Chicago, Ill.

[21] Appl. No.: 701,309

[22] Filed: Feb. 13, 1985

Related U.S. Application Data

[63] Continuation-in-part of Ser. No. 436,057, Oct. 22, 1982, Pat. No. 4,578,842.

[51] Int. Cl.⁴ ............................................. A22C 11/00
[52] U.S. Cl. .................................. 138/118.1; 17/1 R; 426/105

[58] Field of Search .............. 138/109, 118.1; 17/1 R, 17/33, 42, 49; 426/105, 135, 138; 428/36; 206/802; 53/576

[56] References Cited

U.S. PATENT DOCUMENTS 4,335,488 6/1982 Becker .............................. 138/118.1
4,493,130 1/1985 Urbutis et al. ................... 138/118.1

Primary Examiner—James E. Bryant, III
Attorney, Agent, or Firm—Roger Aceto

[57] ABSTRACT

A shirred casing article having a relatively high pack ratio uniformly distributed over the length of the stick and a substantially uniform outside diameter.

7 Claims, 22 Drawing Figures

FIG. 4
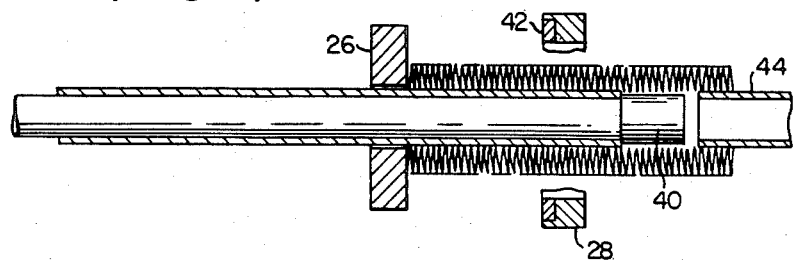
FIG. 5
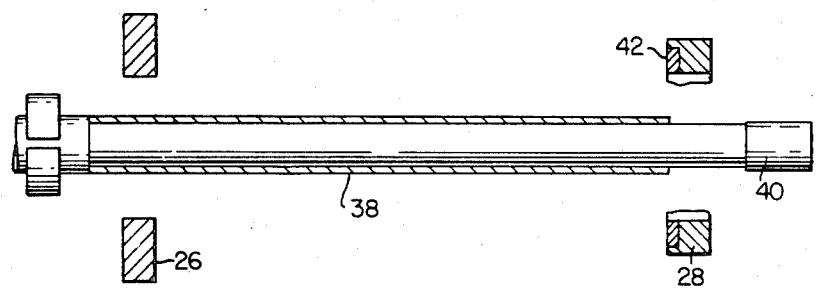
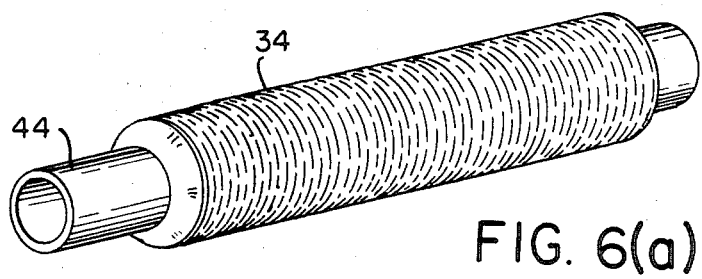
FIG. 6(a)

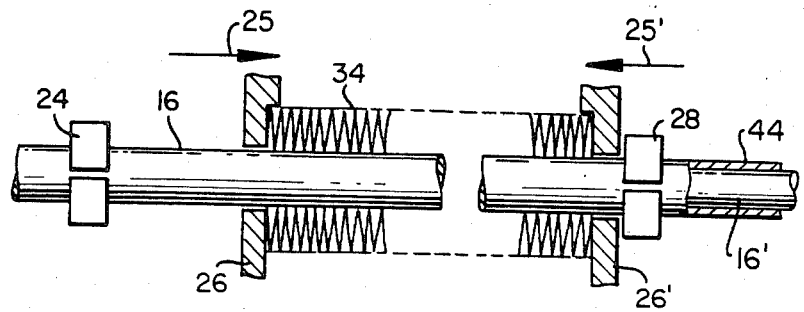
FIG. 6
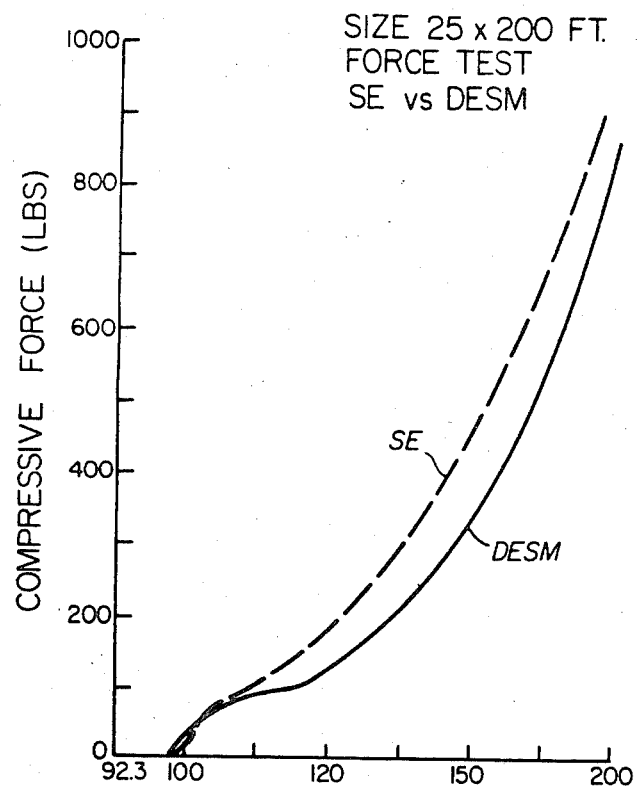
FIG. 10   PACK RATIO (in/in) = $\frac{2400}{L_s}$

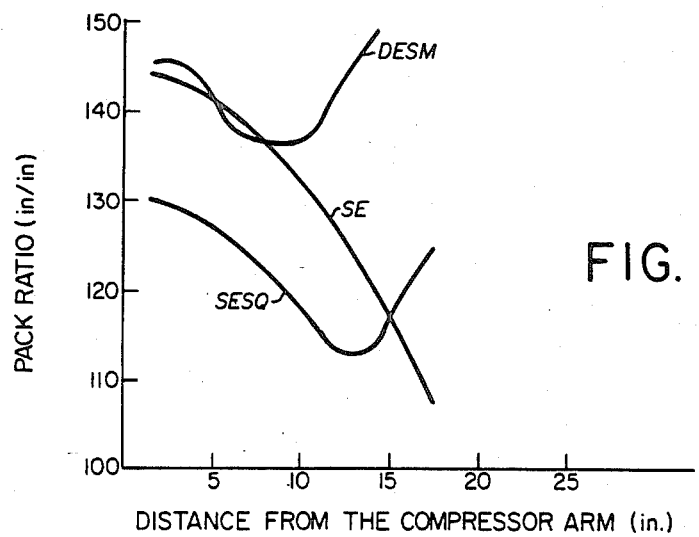
FIG. 7(a) COMPRESSED PACK RATIO DISTRIBUTION. SIZE 21 x 200 FT. UNCORED
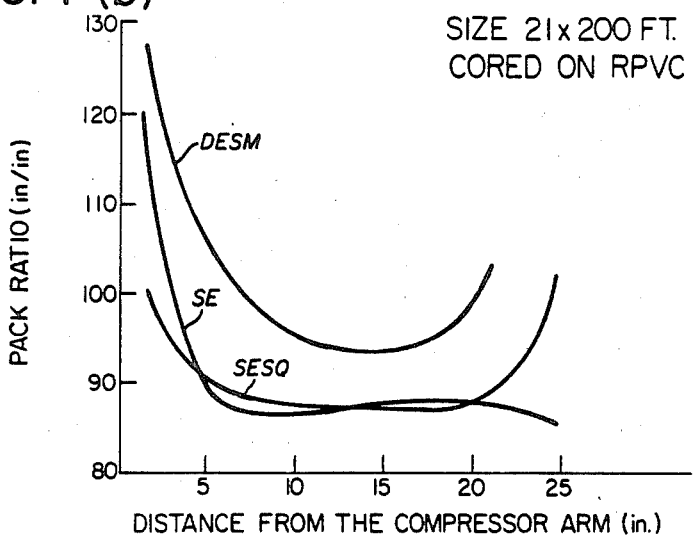
FIG. 7(b) SIZE 21 x 200 FT. CORED ON RPVC

SHIRRED CASING ARTICLE

This application is a continuation-in-part of Ser. No. 436,057, filed Oct. 22, 1982 now U.S. Pat. No. 4,578,842.

BACKGROUND OF THE INVENTION

The present invention relates generally to shirred cellulosic food casing articles and to apparatus and manufacturing methods. In particular, the invention relates to a casing article which exhibits a relatively high and uniform pack ratio over the length of the article.

Casings employed in the preparation of small size sausage products, such as frankfurters, are generally designated "small food casings". As the name suggests, this type of food casing is small in stuffed diameter. Generally, it has an inflated diameter within the range of from about 13 mm to about 40 mm. Small food casings are most usually supplied as thin-walled tubes of very great length. For convenience in handling and use, lengths of these casings are shirred and compressed to produce what is commonly referred to in the art as "shirred casing sticks". A shirred casing stick is an integral, self-supporting tubular article from about 20 cm to about 60 cm in length which contains from 20 to about 50 meters (2000 to 5000 cm) of casing. The inside or bore diameter of the casing stick is sufficient to allow the stick to fit over a stuffing horn sized for rapid filling of the casing.

Shirring techniques for making a shirred casing stick can be generally described as involving the continuous feeding of a length of flat casing feed stock, from a roll for instance, onto a mandrel of a shirring machine. The flat casing is inflated with low pressure gas, usually air. Then the inflated casing is passed through an array of shirring rolls or other shirring means which pleat the casing up against a restraint, on or about the shirring section of the mandrel, until a preselected shirred length has been attained.

The pleats formed in conventional shirring operations are usually laid at an angle to the axis of the mandrel so that the pleats can be described as nesting one into the other, much like a stack of nesting conical elements. Shirring in cooperation with conventional hold back means compacts the nested pleats. After the shirring operation, a strand of the shirred casing is moved to the compaction section of the mandrel where it is subjected to an axial compressive force which further compacts the shirred casing to form the shirred casing stick.

A shirred casing stick when doffed from the mandrel is generally a coherent, self-supporting article which is capable of handling by conventional automatic stuffing apparatus. The coherency of a casing stick or its ability to maintain a structural and mechanical integrity during the rigors of packaging, storage and handling it thought to be the result of the nesting pleats being forced into a closer association, one to another, by the compacting process.

Coherency of the stick is determined by measuring the bending moment of the stick in inch-pounds at the breaking of the stick. The testing procedure is to support the stick on V-shaped brackets spaced a distance (D) apart. A centrally located pressure member having arms spaced a distance D less four inches is pressed against the stick until the stick breaks. Using this technique, a coherency of 1.2 inch-pounds is considered minimally acceptable for automatic handling of the stick.

Compaction is described in the art in terms of "pack ratio", which is simply the ratio of the length of the unshirred casing to the length of the shirred, compacted casing stick. This ratio, for frankfurter size casing generally, has been in the order of 70 to 100; that is 70 to 100 feet of casing being shirred and compacted to a stick measuring about one foot in length.

It should be appreciated that coherent sticks having a high pack ratios are desired for optimum operation of a continuous, automatic stuffing machine. The greater the length of casing that is compacted into a relatively short stick, the greater the amount of stuffed product that can be made before the supply of casing is depleted.

While shirred casing sticks having high pack ratios are desired, as a practical matter there are a number of factors which tend to discourage manufacture of sticks having pack ratios much in excess of about 70 to 100.

For example, as the pack ratio increases, the likelihood of casing damage increases. This damage is manifested by pinholes in the casing. Pinholes are thought to be caused by the friction between adjacent pleats of the shirred casing as the compaction force pushes the pleats axially one against the other, and by friction between the pleats and the compaction section of the shirring mandrel. As a general rule, there should be no more than $1\frac{1}{2}$ pinholes per 10,000 feet of casing.

Also, it is known that pleats of the shirred casing tend to expand or otherwise grow inwardly as the shirred casing is compacted axially. Even after the compaction force is released and the stick is doffed from the mandrel, the bore will continue to grow smaller over a period of time. This inward growth of the pleats, both during the compaction process and, subsequently, after doffing, has been found to vary in proportion to the magnitude of the compaction force.

Any reduction in bore diameter of the stick is in opposition to the desirable feature of having as large a bore diameter as possible. Maintaining a large stick bore is desirable because it will permit the stick to fit over, or otherwise accommodate, the largest stuffing horn in terms of cross sectional area for a given casing size. This is important because it is desirable to stuff at a low product pressure. Maximizing the internal cross-sectional area of the stuffing horn will maximize product throughput at minimum stuffing pressure. The bore size of a casing stick is often given in terms of its "drop fit". The test to determine drop fit simulates placement of the casing stick over a stuffing horn and is a measure of the largest diameter horn which can be extended through the stick without damaging the stick.

Concurrent with bore reduction, it is also recognized that the compacted casing stick will begin to grow and elongate as soon as the compacting force is released. The greatest proportion of growth occurs immediately after the compacting force is released. Thereafter, the growth gradually diminishes. Accordingly, it is recognized in the art that a compacted shirred casing stick is resilient and has the potential of storing a portion of the energy exerted in compacting the shirred casing.

Stick growth will reduce pack ratio (casing length divided by stick length) so this requires the compacting operation to produce a stick which has a higher pack ratio than the desired, finished, or doffed stick pack ratio. Consequently, it may not be possible to obtain a finished or doffed stick having a high pack ratio even though the pack ratio of the finished or doffed stick is below a pack ratio range causing pinhole damage. This is because, to achieve such a high doffed pack ratio, it is necessary to compact the casing to a still higher pack ratio within the range likely to cause pinhole damage.

It also has been observed, particularly for the small size casings used to make frankfurter type products, that when a shirred stick is highly compacted in an effort to maximize its pack ratio, the coherency or structural integrity of the compressed stick deteriorates to a point whereby the stick is rendered nonfunctional. When the coherency of the stick is below about 1.2 inch-pounds, the stick becomes too fragile, is easily broken, and cannot be automatically handled by a stuffing machine, nor mounted on a stuffing horn.

Since the shirring process is known to produce pleats which nest one with another, much the same as a stack of nested cones, it is speculated that this loss of coherency when excessive compaction forces are applied, occurs because such forces tent to straighten out the "nesting cone" geometry produced during the shirring process. Thus, while compaction is needed to form a coherent stick, increasing the compaction force beyond some point will work to reduce coherency.

Compaction of a shirred casing is accomplished by any one of several single-ended compression methods.

For example, in single-ended compression, (SE) a first end of the shirred casing is held against a restraint while a movable compaction arm applies an axial force to a free second end of the casing. After compaction in this manner, the casing is doffed from the mandrel.

In another variation, the force is applied first to one end and then to the other. In this case, the strand of shirred casing first undergoes a single-ended compression as set out above. Then, the restraint is released and shifted to hold the second end of the casing while an axial force is applied to the first end. This can be accomplished by doffing the shirred casing stick in order to turn it end for end on the mandrel, by turning the mandrel end for end with the casing stick still mounted thereon, or by opening the restraint to pass the shirred casing along the mandrel, and then closing the restraint and applying an axial force in the reverse direction.

In the latter version, the force is applied first to the end and then to the other, so the term single-ended "sequential compression" (SESQ) would be an apt description of the method. Compaction methods as set out above are more particularly described in U.S. Pat. Nos. 2,001,461, 3,209,398 and 3,112,517.

"Compaction", as used herein, should be understood to mean compaction while controlling the inside diameter or bore size of the shirred casing. This requires compaction about a mandrel which establishes the desired inside diameter of the shirred casing during compaction to limit inward growth of the casing pleats. The diameter of the mandrel is larger than the final desired bore diameter of the casing stick to accommodate the reduction in bore diameter of the stick which occurs over time.

Close examination of shirred casing sticks made by a single-ended compaction method has disclosed that its pack ratio gradually diminishes from one end of the stick to the other. In its compacted condition, the restrained end has the lower pack ratio, and the end nearest to the compacting arm has the higher pack ratio. In sticks made with the single-ended sequential compression method, the pack ratio tends to be higher at each end and generally lower around the midpoint of the stick.

It is believed that friction between the pleats and the mandrel, as the pleats move along the mandrel, is the cause of this uneven pack ratio distribution. The end of the stick adjacent the compaction arm has its peats compacting and growing inward to engage about the mandrel sooner than the pleats at the restrained end of the stick. Consequently, the resistance to movement of the compaction arm increases as more and more pleats begin to frictionally engage the mandrel, thereby resulting in a reduction of pack ratio from its "compaction arm end" to its "retrained end".

Casing length is another factor in the uniformity of the pack ratio distribution. The distribution is more uniform for shorter lengths of casing. As casing lengths increase, the uniformity of pack ratio tends to change over the length of the stick.

Maintaining a pack ratio as close as possible to the maximum (short of pinhole damage) over the full length of the stick translates to more casing per given stick length and a higher overall or average pack ratio. Having a near maximum pack ratio at one end of the stick, or the other, and a lower pack ratio at another part, translates to less casing per given stick length and a lower overall or "average" pack ratio.

In practice, conventional shirred casing sticks have had characteristics representing a compromise from the characteristics of an "ideal" stick in order to balance the competing factors of: little or no growth in terms both of length and of reduction in bore size after removal of the compaction force; high pack ratio; coherency; and large inner diameter or bore size.

In a application, Ser. No. 363,851, now abandoned which is a continuation-in-part of Ser. No. 261,304, filed May 1, 1981, now abandoned in the name of Mahoney, et al, a shirred casing article, termed a "cored high density" or CHD article, is disclosed. A CHD article has a shirred and highly compacted casing disposed on a tubular core, wherein the core is either used as a stuffing horn or has a bore size sufficient to fit over a stuffing horn. The core further supports the casing so that the cored article is highly coherent.

Use of a tubular core, which takes up space in the bore of the shirred casing, was expected to decrease the bore size of the casing article. Contrary to what was expected, it was found that by placing the compacted shirred casing about a tubular core, it was possible to provide longer than conventional casing lengths compacted to higher than conventional pack ratios without a significant reduction in bore size. Moreover, since the core supports the casing, coherency of the casing is removed as a design factor, even though the compacting forces may have altered the nesting cone geometry of the casing.

When the core is sufficiently rigid to resist the axial and radial inward forces generated by the compacted casing, it is unexpectedly found that the space taken up by the core does not reduce the effective bore size of the article, and that much higher forces can be applied to attain the higher pack ratios without the previously experienced consequence of bore reduction.

Other surprising results, and the advantages of compacting to a high pack ratio about a core, are more fully set out in the aforementioned CHD patent application, the disclosure of which is incorporated herein by reference. It is sufficient for purposes of the present invention merely to say that the data obtained from the examples, as set out in the CHD patent application, clearly establishes the benefits of using a rigid tubular core to resist inward growth of shirred casing compacted to higher than conventional pack ratios. The data from said examples also demonstrates and confirms that elongation or growth in stick length occurs after the compacting forces have been released.

When producing a CHD article, wherein longer than conventional lengths of casing are shirred and routinely compacted to higher than conventional pack ratios (above 100) about a tubular core, the disadvantages of compacting the casing from one end or the other by single-ended (SE) and single-ended sequential (SESQ) compaction techniques becomes most evident.

In one aspect, where casing is compacted directly on the core, cores are found to undergo a localized buckling compression failure during compaction as more and more of the axial compaction loading is transmitted to the core by the compacting casing. Cores which do not fail in this fashion sometimes collapse or undergo a reduction in bore size when doffed, due to the loading caused by radial inward expansion of the compacted casing. Collapse and buckling of the core may also occur, but is less of a problem where the casing is compacted on a mandrel and subsequently transferred to a core.

By altering the compaction method, it has been found that there is an improvement in the desirable characteristics of the shirred casing article. In particular, the compaction method as described herein uses less force than prior art compaction methods to produce a given pack ratio, and the resulting casing article has a more uniform pack ratio distribution over the length of the article for a given compaction force than the SE and SESQ compaction methods. The article of the present invention further exhibits an overall pack ratio higher than that which can be obtained with the same force applied by the other compaction methods, has a higher pack ratio without increasing pinhole damage, and exhibits less stick growth or reduction in bore size over time.

It has been found that the casing stick of the present invention possesses many of the desirable attributes of an "ideal" shirred casing stick, such as a high pack ratio, a relatively uniform pack ratio over the length of the stick, low stick growth, maintenance of bore size after doffing from the compaction mandrel, among others.

These features are exhibited by a casing article compacted by a double-ended simultaneous (DESM) compaction method, wherein during compaction, both ends of the shirred casing are free to move with respect to the size controlling mandrel responsive to substantially equal and opposite forces applied simultaneously to both ends of the casing. This causes the simultaneous displacement of both ends of the shirred casing towards a mid point of the stick. It is believed that the simultaneous displacement of both ends towards the middle results in less friction between the casing and mandrel, and less opportunity for friction induced casing damage, so that greater, more uniform pack ratios can be achieved.

Shirred casings, compressed in this manner, have also evidenced less pinhole damage at higher pack ratios and have shown a reduced tendency to elongate or to undergo a reduction in bore size after doffing from the compaction mandrel.

Compaction to a given pack ratio according to a double-ended simultaneous method as described herein, is accomplished with less applied force than other prior art compaction techniques. Less applied force during compaction means there is less stored energy available for subsequent release by the compacted shirred casing stick in the form of stick growth and inward expansion of the individual pleats. Accordingly, the resulting article exhibits a greater stability over time in terms of maintaining pack ratio and bore size.

Elongation and reduction in bore size are further reduced in the case of casing articles using a core member as set out in the CHD patent application mentioned above. This is due in part to the friction between the core and casing and the rigidity of the core material.

The shirred casing stick as described herein can be made on either a floating or withdrawing mandrel type of shirring machine, in several ways. For example, in one way, the shirred casing can have its midpoint fixed with respect to the mandrel, while opposite forces are simultaneously applied to each end of the casing for displacing each end toward the midpoint.

In another arrangement, the casing is placed on a size controlling sleeve which can slide along the mandrel. One end of the casing is placed against an end restraint and a force is applied against the other end of the casing while the sleeve is allowed to slide through the restraint. It is believed that allowing the sleeve the freedom to slide with respect to the mandrel and through the restraint, has the same effect as the application of substantially simultaneous, equal and opposite forces to the ends of the shirred casing located about the sleeve. After compaction, the casing is doffed from the mandrel (or sleeve) onto a core. In the alternative the casing can be doffed with the sleeve wherein the sleeve is the core.

SUMMARY OF THE INVENTION

The present invention may be characterized in one aspect thereof by a shirred tubular casing stick having a 0.416 to 0.500 drop fit and containing 200 feet of pinhole free cellulosic casing with an inflated diameter of about 0.73 to 0.83 inches, and the pack ratio of the article being at least 113 at given segments of stick length over substantially the full length of the stick and the pack ratio being so uniform over the length of the stick that the variation of the pack ratio in successive one inch segments along the length of the stick is represented by a straight line as calculated by the least squares method whose slope has an absolute value of less than about 0.200.

In another aspect the invention is characterized by a coherent casing article comprising (a) a tubular core having a bore which is a size that is at least equivalent to the inside diameter of a stuffing horn selected from a range of stuffing horns used for filling a certain size of cellulosic casing; and (b) a compressed casing stick on the core, the stick containing at least about 200 feet of a moisturized, substantially pinhole-free, length of said certain size of cellulosic casing, shirred and longitudinally compacted to such a degree that the compressed casing stick embraces and exerts inward forces on the tubular core, the core being sufficiently rigid to resist the forces so as to maintain a bore diameter no less than the equivalent inside diameter of the selected stuffing horn;

(c) the compressed casing stick having in any one inch segment of stick length over substantially the full length of said stick, a pack ratio of casing length to segment length of at least 100; and (d) said pack ratio being substantially uniform over the length of the stick such that the variation of the pack ratio along the length of the casing stick in successive one inch segments is represented by a straight line as calculated by the least squares method, whose slope has an absolute value of less than about 0.5.

DESCRIPTION OF THE DRAWINGS

FIGS. 2-5 are views of the compacting section of the shirring apparatus on an enlarged scale showing the various compacting;

FIG. 6 is a schematic drawing showing still another embodiment of the invention;

FIG. 6a is a perspective view of a cored casing article of the present invention;

FIG. 10 is a graph showing the relative forces needed to compact like strands to the same length using different compaction methods.

DESCRIPTION OF THE PREFERRED EMBODIMENTS

Figure 1:
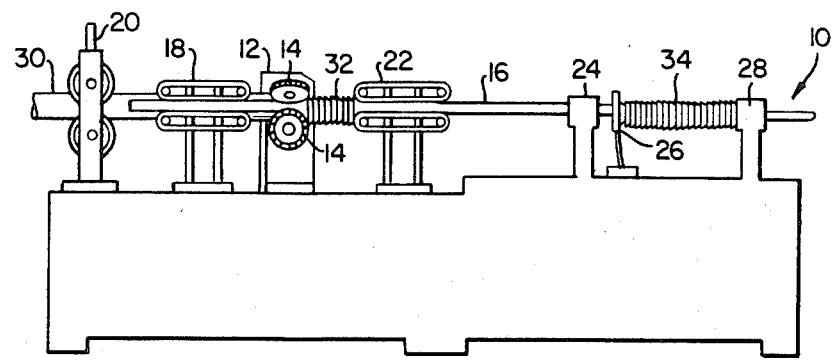
FIG. 1 is an elevational view of one apparatus which may be used to produce an article according to the present invention, the figure showing the shirring operation completed and showing a shirred casing length transported to the compacting section of the apparatus.

Referring to the drawings, FIG. 1 shows a typical floating mandrel-type shirring machine, generally indicated at 10. Shirring machines and the products thereof are shown in U.S. Pat. Nos. 2,983,949 and 2,984,574 among others.

A shirring head 12 is mounted on the machine, the head including a plurality of shirring wheels 14. These wheels, usually three in number, are of a general type which is described in U.S. Pat. No. 3,461,484.

Shirring wheels 14 are disposed about a mandrel 16 which extends generally the length of the machine. Also disposed about the mandrel, but forward of the shirring head 12, or to the left as viewed in the figure, are feed belts 18 and feed rollers 20. Disposed about the mandrel aft of the shirring head is a hold back means such as belts 22, a first clamp 24, a compactor arm 26 and a second clamp 28.

The operation of these components for shirring tubular casing is well known in the art. Briefly, an inflated casing 30 is fed onto mandrel 16 at the fore end by feed rolls 20 and feed belts 18. This casing passes between shirring wheels 14 which shirr the casing in conjunction with holdback means 22. As is known in the art, the holdback means 22 retard the advance of the casing passing from the shirring rolls in order to provide a substantially regular pleat formation and to partially compact the shirred casing shown at 32. It is also known to rotate the holdback means about the mandrel in order to impart a slight twist to the shirred casing. Twisting the shirred casing tends to produce straighter strands.

It should be appreciated that the operations of shirring and partially compacting the casing lay the pleats of the shirred casing at an angle to the axis of mandrel 16 so that the individual pleats nest one against the other similar to a stack of nested cones.

After the initial shirring and partial compaction, a strand of the casing is separated, either adjacent the shirring wheels 14 or downstream of the holdback means 22. This separated strand is transferred along the mandrel towards first clamp 24. First clamp 24 and compactor arm 26 both open to permit movement of the strand, either manually or by automatic means, to the compacting station which is between the first and second clamps. The operation of first clamp 24 and compactor arm 26 to permit such a transfer is conventional, and FIG. 1 shows a strand 34 of shirred and partly compacted casing at the compacting station.

Figure 2:
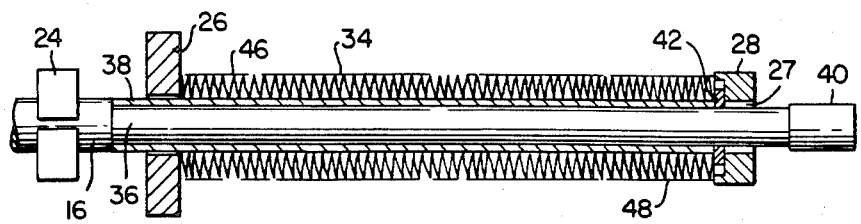

More details of the compacting station are shown in FIG. 2. Mandrel 16 at the compacting station includes an inner shaft 36 and a sliding sleeve 38 mounted on the shaft. Shaft 36 and sleeve 38, while shown as being a part of, or an extension of, the mandrel, could be elements separate from the mandrel to which a shirred casing length is transferred for compacting.

Inner shaft 36 has a diameter which is reduced from the full diameter of mandrel 16 so that sleeve 38 has its outside diameter substantially matching the outside diameter of the mandrel. This will permit strand 34 to transfer along the mandrel and onto the sleeve.

Sleeve 38 preferably is made from, or is coated with, a material that has a relatively low coefficient of friction and which is strong enough to withstand the forces generated by the inward expansion of the casing during compaction.

Sleeve 38 is adapted to slide freely along shaft 36 and through second clamp 28. For this purpose the second clamp, even when closed, provides a clearance space 27 for the free passage of the sleeve. Limits to the sliding movement of the sleeve are established at its fore end by the full diameter of mandrel 16 and at the aft end by an adjustable sleeve stop 40. Sleeve stop 40 is shown in FIGS. 2-5 as a member threaded onto the end of shaft 36 wherein the threaded engagement affords a means to adjust the position of the stop.

An intermediate limit to the travel of sleeve 28 is set by a sleeve retainer 42. This retainer is preferably part of second clamp 28 but can open or close independently of the second clamp for purposes set out hereinbelow.

In operation, first clamp 24 and compacting arm 26 are open to permit passage of a shirred and partly compacted casing length or strand 34 along the mandrel and onto sleeve 38. Sleeve retainer 42 is in a closed position about shaft 36 during the transfer operation to support the mandrel and to prevent the axial movement of the sleeve through clearance space 27 as the strand is being transferred onto the sleeve.

It should be appreciated that during the shirring operation, the bore size of the shirred casing is determined by the size of shirring mandrel 16, so that the outside diameter of the mandrel is selected to provide the desired inside diameter or bore size of the compacted shirred casing stick to be formed. Likewise, the outside diameter of sliding sleeve 38, in the embodiment as shown in FIGS. 2-5, would be selected to provide the desired bore size. As set out above, the bore size of the compacted casing will grow smaller after the compacted casing article is doffed from the mandrel. Accordingly, the outside diameter of the mandrel and sliding sleeve 38 is selected to be some size greater than the inside diameter of the desired article bore size to accommodate for this bore reduction.

Because the bore of the shirred casing and the outside diameter of both mandrel 16 and sliding sleeve 38 are substantially the same, there is, or may be, some frictional engagement between the shirred casing and sleeve, as strand 34 is moved along the mandrel and onto the sleeve. Accordingly, to prevent movement of the sleeve during casing transfer, sleeve retainer 42 is closed and abuts the end of the sleeve as shown in FIG. 2.

When strand 34 has been transferred past first clamp 24, both the clamp and the compactor arm 26 are closed. The compactor arm then operates to move against a first end 46 of strand 34, to push the strand along the sleeve, until the other end 48, of the strand, is restrained by abutment against sleeve retainer 42 (FIG. 2).

Sleeve retainer 42 now is opened to clear the end of sleeve 38. Movement of the compactor arm 26 in an aft direction, or towards second clamp 28, compacts the strand. As compactor arm 26 moves aft, it compacts the first end 46 of the strand towards the restrained end 48.

During compaction, individual pleats of the strand tend to grow or expand inward. If not restrained, this inward expansion will considerably reduce the bore size of the compacted shirred casing stick. The function of the mandrel, or in the case of the present invention, the function of sliding sleeve 38, is to resist this inward growth.

As the compaction takes only a matter of seconds (less than 5), it is difficult to observe the interaction of the casing and sleeve during the time that the compaction arm 26 moves aft. What is speculated as happening during compaction is that as the compaction arm 26 moves aft, the accumulating friction between the compacting pleats and sleeve 38 works to drive the sleeve through the second clamp 28. This sleeve movement, with respect to second clamp 28 causes compaction of the casing pleats adjacent clamp 28. In this fashion compaction of both ends of the casing is thought to occur simultaneously wherein each end of the casing strand moves towards a mid point of the casing strand.

Figure 3:
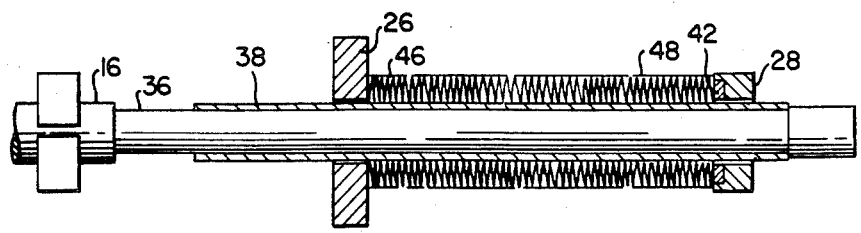

Movement of the ends of the casing strand is demonstrated by comparing, in the figures, the location of the strand ends 46, 48 relative to sleeve 38 at the start of the compaction (FIG. 2) and at the end of the compaction (FIG. 3).

In FIG. 2, the ends of the strand generally correspond to the ends of sleeve 38 whereas, the strand ends in FIG. 3 are spaced inward from the ends of the sleeve. However, in each Figure, the alignment of the mid point of the sleeve with respect to the mid point of the strand does not significantly change.

After compaction is complete, clamp 28 and sleeve retainer 42 are opened (FIG. 4). The strand, now compacted to a coherent stick, is doffed from the sleeve by further movement of compaction arm 26 along the mandrel. During the doffing step, the aft end of sleeve 38 engages against sleeve stop 40 which holds the sleeve to the shaft.

After doffing, compactor arm 26 opens and returns to a home position as shown in FIG. 5. The sleeve also returns to its home position. This can be done manually or by the operation of a return spring (not shown) between the sleeve and sleeve stop or by other appropriate means.

Second clamp 28 and sleeve retainer 42 are then closed to support mandrel 16. First clamp 24 is opened to permit the transfer of another strand of shirred casing along the mandrel and onto sleeve 38.

While FIGS. 2-5 show an arrangement wherein the compacted casing stick is doffed from the sleeve 38 of mandrel 16, it should be apparent that other arrangements are possible. For example, a tubular core, a portion of which is shown at 44 in FIG. 4, could be placed in axial alignment with mandrel 16. Here, when the compacted stick is doffed, it will be doffed onto the core. As another alternative, sleeve 38 could be doffed together with the compacted casing frictionally engaged on the sleeve. In either case, the casing article produced would correspond generally to the cored high density tubular casing article, as more particularly described in the aforementioned CHD, patent application.

In the cored high density shirred tubular casing article as described in said copending application, the tubular core can be attached to a stuffing apparatus to function as a stuffing horn. In the alternative, the core can be slid over, or otherwise mounted on, a stuffing horn. In either case, it should be appreciated that the inside diameter of the sleeve 38 (or core 44) will represent the desired bore size of the cored article formed according to the present invention.

When making a cored article, selection of an appropriate core material involves consideration of several factors as more particularly discussed in the aforementioned CHD patent application. For example, the creep strength of the material must be high enough to resist the forces generated by the compacted casing. Cores having low creep strength would simply stretch or elongate over a period of time and be compressed excessively in a radially inward direction.

FIG. 6 shows a preferred embodiment of the apparatus wherein two compactor arms are used to apply opposing forces simultaneously to both ends of a strand of shirred casing. In this embodiment, a sliding sleeve would not be necessary. Instead the casing strand 34 is positioned on mandrel 16 between two compactor arms 26 and 26'. Compaction is achieved by simultaneously moving both arms against the ends of the strands in the direction of the arrows 25 and 25' so as to simultaneously displace both ends of the strand towards each other.

After compaction in this fashion, arm 26' is withdrawn and clamp 28 is opened so that subsequent operation of arm 26 can move the compacted strand off of the mandrel. It should be appreciated that the compacted strand could be doffed onto a core. In this respect, mandrel 16 would have an extension 16' of reduced diameter as shown in FIG. 6. Core 44 is slipped over and held on this extension so that casing, after compaction, can be transferred along the mandrel and onto the core. The outside diameter of the core is slightly smaller than the diameter of the mandrel to facilitate the transfer. After the casing is on the core, the core is released and moved off of the extension, thereby providing the cored casing article shown in FIG. 6a.

In order to demonstrate the advantages of the present invention, tests were conducted to compare various aspects of single-ended, single-ended sequential and double-ended simultaneous compaction methods. All tests used casings of like size and all tests used 200 ft. lengths of casing shirred and partly compacted to a strand measuring about 27-30 inches. It should be understood that the casing used also had a conventional moisture content sufficient to permit deshirring and stuffing of the casing. The shirring machine used was similar to that described in U.S. Pat. No. 3,461,484, while imposing a twist to the shirred casing as set forth in U.S. Pat. No. 3,397,069.

EXAMPLE I

A first test was to determine the maximum pack ratio for uncored samples of size 21 casing (about 0.73 inch inflated diameter and wall thickness of 0.001 inch) using each of the three compaction methods. To do this, twenty-five strands of size 21 cellulosic casing, each having a bore diameter of about 0.053 inches, where compacted about a 0.50 inch diameter sleeve. One end of the sleeve was allowed to slide freely through the second clamp of the shirring machine, thereby effectively compacting the casing simultaneously from both ends.

After each strand was compressed, it was examined for pinhole damage. Successive strands of the group of 25 were compacted to varying lengths to determine the shortest compacted length attainable without pinhole damage. This shortest compacted length was used to determine the maximum compressed "average" pack ratio for this compaction method, wherein the calculation was simply:

$$PR = (Lc)/(Ls)$$

where
PR = pack ratio
Lc = casing length (200 ft.)
Ls = stick length (feet)

In similar fashion, and as a control, maximum "average" pack ratios were determined for single-ended and single-ended sequential compaction methods. In the single-ended sequential method, the strand was first compacted a given length from one end and then turned end-for-end and compacted the same length from the other end. In both control methods, the strands were compacted about a fixed (not sliding) mandrel 0.50 inches in diameter.

The maximum "average" compressed pack ratio attainable in these tests was 142 for double-ended simultaneous compression, 130 for single-ended compression, and 122 for single-ended sequential compression.

When these articles were doffed from the mandrel, they exhibited a coherency after one week of less than 1.0 inch-pound. These articles, which are not suitable for commercial applications involving automatic handling of the casing, were sufficiently coherent for use in determining pack ratio distribution and drop fits as discussed below.

EXAMPLE II

A like series of tests was conducted to determine the maximum pack ratios for cored samples. This was done for both compaction directly on a core member (either sliding or fixed) and for compaction about a mandrel (or sliding sleeve) with subsequent transfer to a core member.

The limiting factor where casing was compacted on the core was core failure. That is, successive strands (each containing 200 feet of shirred casing) were compacted to varying lengths to determine the point at which the core failed. The shortest length reached prior to core failure was used to determine the maximum average pack ratio.

For casing compacted on a mandrel and then transferred to a core, the limiting factor was pinhole damage because with this technique, pinholes appeared before core failure.

The cores on which the strands of size 21 casing were compacted were each formed with a 0.50 inch O.D. and an I.D. or bore diameter of 0.450 inch. Where the strand was compacted on a mandrel (or sliding sleeve) and subsequently transferred to a core, the O.D. of the mandrel (or sleeve) was slightly larger (0.510 inch) to facilitate subsequent transfer on to the 0.50 inch O.D. cores. An identical series of tests was run using cores made of rigid polyvinylchloride (RPVC) and of high density polyethylene (HDPE).

For compaction on RPVC cores, the maximum average compressed pack ratio was 101 for the double-ended simultaneous method and 90 for each of the control methods. When compacted on a HDPE core, the maximum average compressed pack ratios were 134 for the double-ended simultaneous compression method and 95 for the controls.

The higher pack ratios in each case when using a HDPE core can be attributed to the lower coefficient of friction of HDPE as opposed to RPVC.

When compacting about a mandrel (or sliding sleeve) and then doffing onto a core, the maximum compressed average pack ratio for both the RPVC and HDPE cores was 136 when using the double-ended simultaneous compaction method, 126 for single-ended compaction, and 114 for single-ended sequential compaction.

With these cored articles there proved to be no coherency problem and the support offered by the core virtually eliminated the need to consider the coherency factor.

The results of Examples I and II establish that in each case, the double-ended compaction method of the present invention produced higher average pack ratios than the other methods tested.

The results further showed that pack ratios were lowest for casing compacted directly on the core in that the core failed due to the forces exerted on it by the casing. Compressed pack ratio values for compaction on the mandrel with subsequent transfer to the core were slightly lower than the corresponding Example I values. This can be attributed to the larger diameter mandrel used in Example II to facilitate transfer to the core. That is, the slight increase in mandrel size results in a slight decrease in compressed pack ratio.

EXAMPLE III

All the tests as described in Examples I and II were repeated, only using 200 foot lengths of size 25 cellulosic casing (about 0.83 inflated diameter and wall thickness of about 0.001 inch). The strands of size 25 casing, each having a bore diameter of about 0.61 inch, were compacted on a 0.56 inch O.D. mandrel (or sliding sleeve).

When compacting the casing directly on a core, the core O.D. in each case was also 0.56 inch and the core I.D. was 0.51 inch. When compacting on a mandrel (or sliding sleeve) for subsequent transferal to a core, the core O.D. was 0.56 inch and the mandrel (or sliding sleeve) O.D. was 0.57 inch. Again, the slightly larger mandrel (sleeve) was to facilitate transfer of the compacted strand to the core.

In each case, as in the previous Examples, compaction by the double-ended simultaneous method resulted in higher compressed pack ratios, before evidence of pinhole damage or core failure, than the other methods tested.

As with the previous examples, the uncored articles have very low coherency, whereas coherency was not a problem with the cored article.

The results of Example I–III, that is, the maximum average compressed pack ratios, are summarized in Table I. In each case, this pack ratio was computed by dividing the original casing length (200 feet), by the shortest compacted length (measured while holding the strand in compression) attained without evidence of pinhole damage or core failure.

TABLE I

|  | Uncored | Compacted on Core | | Transferred to Core | |
| --- | --- | --- | --- | --- | --- |
|  |  | RPVC | HDPE | RPVC | HDPE |
| Size 21 |  |  |  |  |  |
| SE | 130 | 90 | 95 | 126 | 126 |
| SESQ | 122 | 90 | 95 | 114 | 114 |
| DESM | 142 | 101 | 134 | 136 | 136 |
| Size 25 |  |  |  |  |  |
| SE | 158 | 94 | 108 | 149 | 149 |
| SESQ | 143 | 101 | 111 | 138 | 138 |
| DESM | 174 | 121 | 170 | 167 | 167 |

SE = Single-ended compaction
SESQ = Single-ended sequential compaction
DESM = Double ended simultaneous compaction
RPVC = Rigid polyvinylchloride
HDPE = High density polyethylene The maximum compressed average pack ratio, as established by Examples I–III for each given set of conditions, was used as a standard in producing compacted strands of casing for subsequent testing. In this respect, and unless otherwise stated, it should be understood that production of compacted strands for evaluating other parameters involved shirring 200 foot lengths of size 21 and size 25 casing and then compacting each shirred strand under a given set of conditions to that compressed length which produced the maximum average pack ratio in Examples I–III for the same set of conditions.

EXAMPLE IV

After determining the maximum average compressed pack ratio, tests were conducted to determine the compressed pack ratio distribution over the length of the compacted strand. This was done by compacting a shirred strand to the appropriate length (i.e., shortest pinhole fee length or shortest length without core failure) for a given set of conditions as established by Examples I–III. While holding the strand at this compressed length, it was marked off in one inch intervals beginning at the compressor arm.

Due to the configuration of the compacting apparatus, it was not possible to measure off increments from end-to-end of the compacted strand. Instead, measurements started and ended about 1½ inches from each end.

After measuring and marking-off each one inch increment of compacted strand, the strand was removed from the compaction apparatus and deshirred. Measurements were then made to determine the amount (length) of casing material contained in each marked off increment. This length was used to determine the distribution of the as-compacted pack ratio along the stick.

Ten strands compacted according to each method (for both cored and uncored samples) were deshirred and measured to determine the pack ratio at each increment for each compacted strand.

The average pack ratio at each increment, for the ten strand sample, was calculated to provide a profile of an average compacted strand in terms of the compacted pack ratio distribution over the length of the compacted strand. The graphic presentation of the distribution is shown in FIG. 7.

FIG. 7(a) shows the average compressed pack ratio distribution for uncored, size 21 casing compacted according to the single-ended, single-ended sequential and double-ended simultaneous methods.

Figure 7C:
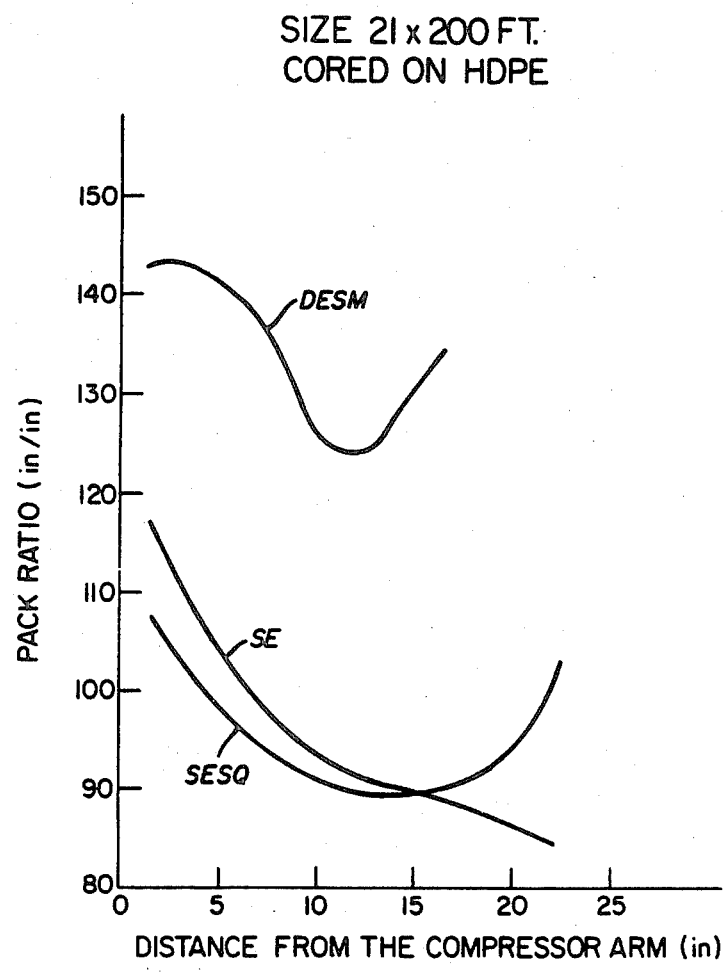
FIGS. 7 and 8 are graphs showing the average pack ratio distribution along the length of the compacted strands of casing for various compaction methods.

FIGS. 7(b) and 7(c) are similar in that they show the average compressed pack ratios for size 21 casing compacted directly on the RPVC and HDPE cores.

The graphs as shown in FIG. 7 demonstrate that compaction by the double-ended simultaneous method resulted in a compacted strand having, on the average, a higher pack ratio in substantially each increment as compared to strands compacted according to the single-ended or single-ended sequential methods. The lower pack ratios for all methods, attained when using a RPVC core, is attributed to the higher coefficient of friction of RPVC as compared to HDPE.

Figure 8A:
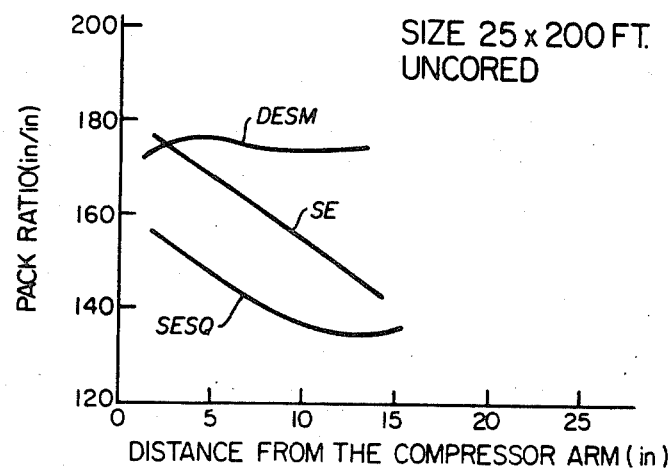
Figure 8B:
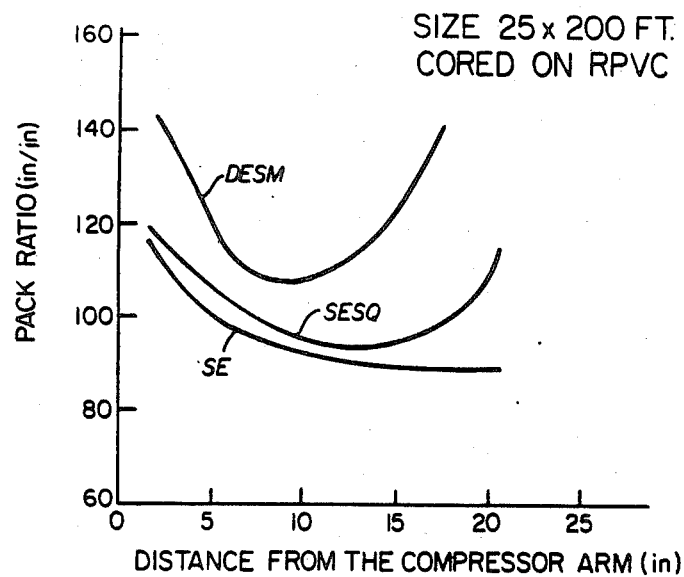
Figure 8C:
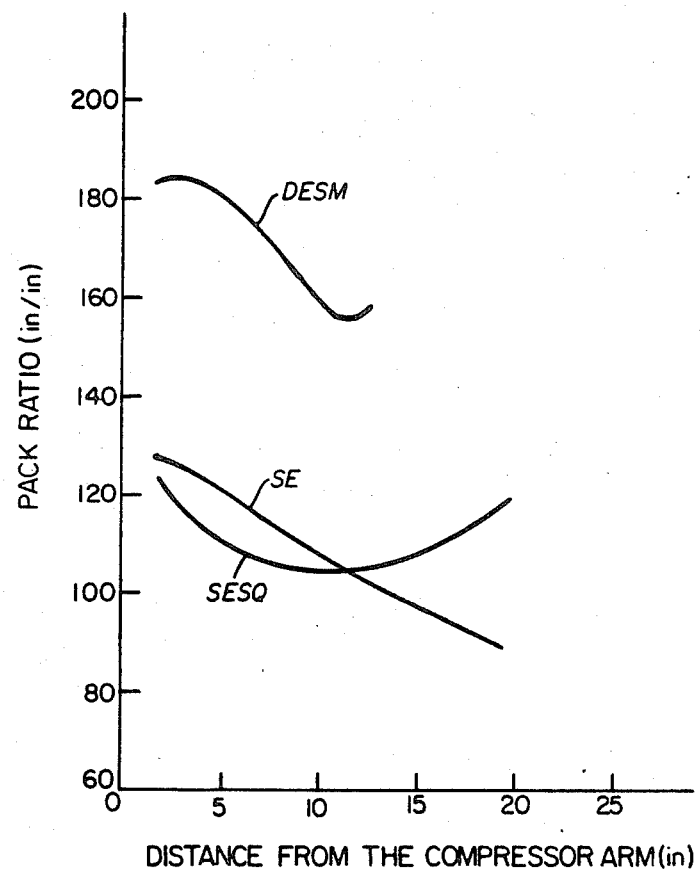
Figure 9A:
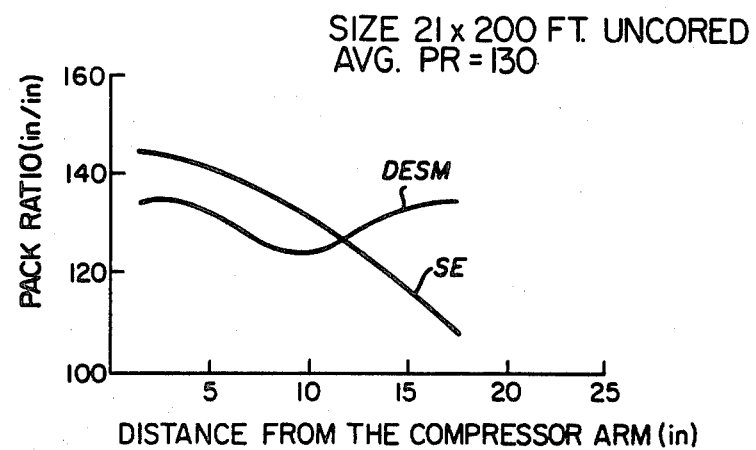
FIG. 9 is a series of curves showing a relative comparison of the uniformity of the average pack ratio distribution for like strands compacted to the same lengths by various compaction methods.
Figure 9B:
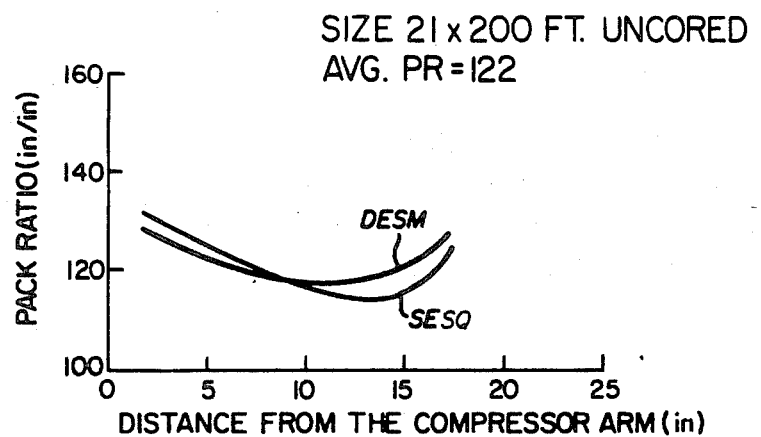
Figure 9C:
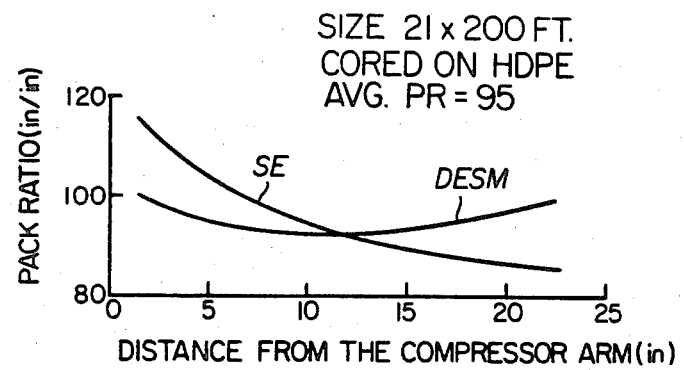
Figure 9D:
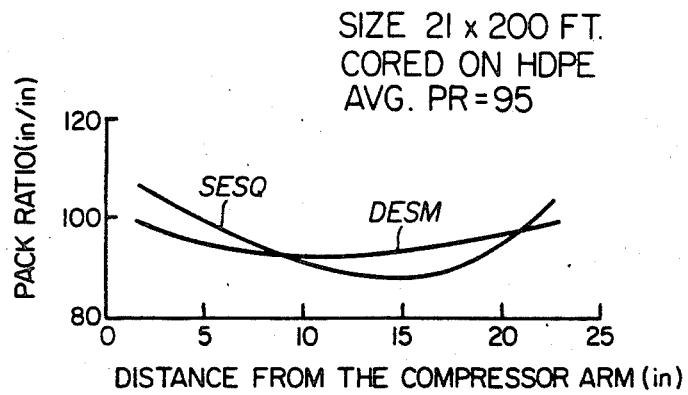
Figure 9E:
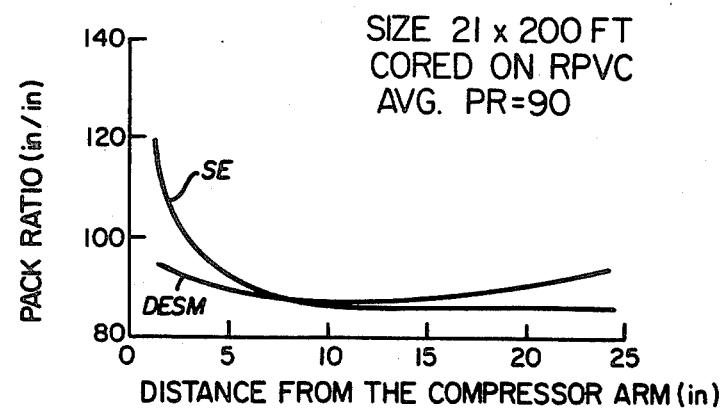
Figure 9F:
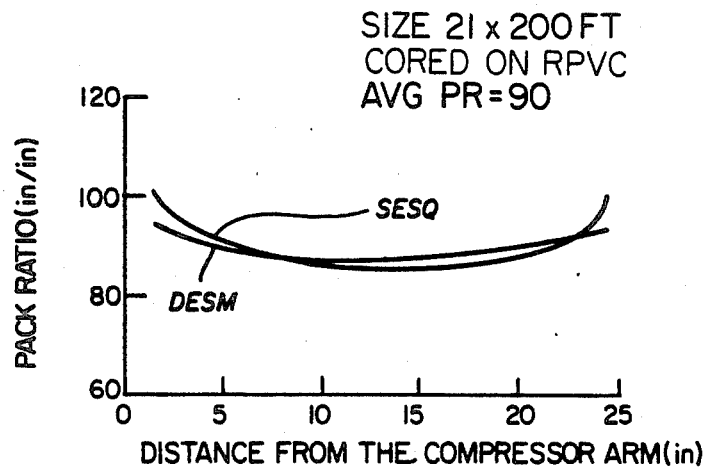

The results of a similar series of tests using Size 25 casing is graphically presented in FIGS. 8 a–c. Again, in each case, the articles made by the method of the present invention achieved a higher average pack ratio at each increment than the articles made by the other methods tested.

EXAMPLE V

It should be appreciated that the graphs of FIGS. 7 and 8 illustrate only that articles of the present invention have an average pack ratio which is higher at each given increment over the length of the strand than articles made by the other compaction methods tested. These graphs do not illustrate the uniformity of the pack ratio which may be achieved by double-ended simultaneous compaction. This uniformity can be shown by applying the same forces to compact the same casing lengths to the same pack ratio by each of the various methods. Accordingly, ten (10) strands each of size 21 and size 25 casing were compressed by double-ended simultaneous compaction to the same lengths (i.e. same average pack ratio) achieved by each of the control methods.

While under compaction the strands were marked off in one inch increments. The casings were then deshirred to determine the length of casing contained in each increment. When compacted to the same length (i.e. pack ratio), it was found that the articles according to the present invention have a pack ratio distribution which generally is more uniform from end-to-end than the articles compacted by the other methods tested. The graphs of the results for the size 21 casing, as shown in FIG. 9 a–f, are also representative of the results for size 25 casing.

EXAMPLE VI

The lengths of uncored compacted strands, which were compacted to the maximum pack ratios as given in Table I, were measured after doffing and again one week later. The lengths of the compacted strands also were measured for purposes of computing the average pack ratio after doffing and again one week later.

The results as set out in Table II show that the pack ratio of strands compacted according to the DESM method remained higher than the control methods both after doffing and after one week. The one week pack ratios of the DESM sticks being greater shows that these sticks were still shorter after one week than the controls.

The same comparison, only made with cored samples is also shown in Table II. In each instance, the pack ratio of the cored article made by double-ended simultaneous compaction was higher than the pack ratio of cored articles made by the other methods tested.

TABLE II

| A. UNCORED | Pack Ratio Doffed and (one week) |
|---|---|
| Size 21 | |
| SE | 115(108) |
| SESQ | 114(107) |
| DESM | 125(116) |
| Size 25 | |
| SE | 136(126) |
| SESQ | 128(120) |
| DESM | 150(134) |

| | Compacted on Core | | Transferred to Core | |
|---|---|---|---|---|
| B. CORED | RPVC | HDPE | RPVC | HDPE |
| Size 21 | | | | |
| SE | 87(87) | 92(88) | 116(115) | 113(113) |
| SESQ | 88(88) | 93(91) | 108(107) | 106(105) |
| DESM | 97(97) | 124(122) | 124(124) | 123(119) |
| Size 25 | | | | |
| SE | 92(92) | 104(102) | 135(134) | 135(131) |
| SESQ | 99(99) | 108(105) | 128(128) | 128(125) |
| DESM | 117(115) | 154(150) | 148(147) | 146(142) |

In general, comparison of the compacted pack ratio (Table I) with the pack ratio one week after doffing (Table II) shows that the cored samples lost a smaller percentage of the compacted pack ratio than the uncored samples. And, in all cases but one, final or one week pack ratio for each cored sample made by transferring the compacted casing to a core was higher than its uncored counter part.

EXAMPLE VII

Uncored samples, after compaction to the maximum pinhole free pack ratio as given in Table I, were held unrestrained for one week. The strands were then marked off in one inch intervals and deshirred to determine the length of casing contained in each one inch interval. The average casing length at like one inch intervals is set out in Table III.

The results show that strands compacted by the double-ended simultaneous method, maintain a higher average pack ratio at given increments over substantially the major portion of length of the strand after one week than strands compacted by the control methods.

In Example VI, the uncored size 21 DESM article had an overall or average pack ratio after one week of 116. Table III shows that this average pack ratio is obtained by maintaining the incremental pack ratio above about 113 over a major portion of the strand length. In contrast, strands compacted by the single-ended compression method were at this level for only a small portion of the strand length. The average pack ratio of each strand compacted per the single-ended sequential method was below this level over its entire length.

Table III shows similar results for size 25 casing where the overall or average pack ratio of 134 for the DESM uncored article (see Table II) was obtained by maintaining the incremental pack ratio above about 130 over a major portion of strand length. Strands compacted per the control methods maintained this average pack ratio for only a small portion of the strand length.

Table III further demonstrates that, in general, the pack ratio at the extreme ends of the casing article is lower than the pack ratio at points elsewhere along the article. This is because the extreme ends of the article experience the greatest compaction force and consequently, experience the greatest elongation when the force is released. Accordingly, it should be understood that describing the casing article of the invention as having a substantially uniform pack ratio at increments along its length is exclusive of the extreme ends of the article.

TABLE III

| DISTANCE FROM COMPRESSOR ARM (inches) | SE | SESQ | DESM |
|---|---|---|---|
| Size 21 | | | |
| 0.5 | 110.1 | 108.1 | 91.3 |
| 1.5 | 110.3 | 111.5 | 116.2 |
| 2.5 | 113.5 | 111.0 | 117.4 |
| 3.5 | 114.0 | 109.6 | 117.6 |
| 4.5 | 111.8 | 112.0 | 119.8 |
| 5.5 | 115.4 | 108.5 | 117.6 |
| 6.5 | 113.3 | 109.3 | 118.9 |
| 7.5 | 111.1 | 105.1 | 117.4 |
| 8.5 | 113.7 | 107.7 | 115.4 |
| 9.5 | 111.9 | 104.2 | 113.4 |
| 10.5 | 109.5 | 100.3 | 113.8 |
| 11.5 | 107.6 | 111.4 | 115.6 |
| 12.5 | 106.7 | 99.6 | 114.2 |
| 13.5 | 108.2 | 104.3 | 118.0 |
| 14.5 | 104.4 | 103.4 | 118.7 |
| 15.5 | 104.9 | 101.1 | 116.6 |
| 16.5 | 104.1 | 106.9 | 120.8 |
| 17.5 | 101.2 | 103.8 | 120.6 |
| 18.5 | 101.6 | 108.4 | 121.3 |
| 19.5 | 99.6 | 110.2 | 119.0 |
| 20.5 | 95.6 | 110.6 | |
| Size 25 | | | |
| 0.5 | 96.3 | 119.6 | 112.6 |
| 1.5 | 131.2 | 132.8 | 142.1 |
| 2.5 | 139.7 | 129.6 | 138.9 |
| 3.5 | 127.8 | 123.8 | 137.6 |
| 4.5 | 133.8 | 121.9 | 133.0 |
| 5.5 | 136.7 | 123.9 | 138.8 |
| 6.5 | 130.9 | 123.6 | 132.1 |
| 7.5 | 128.6 | 127.6 | 130.8 |
| 8.5 | 130.8 | 118.4 | 137.1 |
| 9.5 | 129.4 | 115.1 | 131.5 |
| 10.5 | 131.1 | 120.8 | 137.4 |
| 11.5 | 125.5 | 117.8 | 134.1 |
| 12.5 | 134.1 | 119.3 | 139.6 |
| 13.5 | 121.1 | 121.6 | 140.6 |
| 14.5 | 122.4 | 117.4 | 132.6 |
| 15.5 | 122.4 | 117.4 | 130.6 |
| 16.5 | 115.7 | 124.5 | 142.3 |
| 17.5 | 118.7 | 118.9 | 120.1 |
| 18.5 | 118.1 | 119.8 | |
| | | 86.4 | |

EXAMPLE VIII

The bores of the strands as compacted in Examples I–III were measured immediately after doffing, and again one week later, using a standard "drop fit" test. Briefly, in a "drop fit" test, the compacted strand is placed over the upper end of a vertical stainless steel rod of known diameter and of a length longer than the compacted strand. The strand is dropped and allowed to fall freely around the rod. If the strand falls to the end of the rod, the test is successful. Rods of various diameters are used with the largest rod over which the strand freely falls for its entire length being the effective internal diameter of the compacted strand, i.e., the "drop fit" diameter.

Table IV gives the average drop fit diameter of ten samples with the number in parenthesis being the one week drop fit. Reference should also be made to Table I which gives the compacted pack ratio and to Table II which gives the doffed and one week pack ratio for each sample.

The results of the drop fit test as set out in Table IV, show that uncored strands of casing, compacted according to the double-ended simultaneous methods, even though compacted to higher pack ratios, maintain bore diameters after one week which are equal to, or greater than the bore diameters of strands compacted according to the control methods.

Except for three instances, the same holds true for cored samples. However, the relatively small reduction in bore size in these three instances is negligible in view of the substantially higher pack patios of casing compacted by the double-ended simultaneous method, as compared to the lower pack ratios of articles made by the control methods (see Table I). Moreover these three instances all occur with HDPE cores which indicates that cores of this material were not able to adequately resist the forces exerted on the core by the compacted casing. When considering that each uncored sample failed to meet the coherency requirements for commercial application, the cored article in each instance is considered to be commercially superior to the corresponding uncored article.

TABLE IV

|  | Uncored | Compacted on Core | | Transferred to Core | |
| --- | --- | --- | --- | --- | --- |
|  |  | RPVC | HDPE | RPVC | HDPE |
| Size 21 |  |  |  |  |  |
| SE | .448 | .438 | .438 | .438 | .438 |
|  | (.427) | (.438) | (.438) | (.438) | (.427) |
| SESQ | .468 | .438 | .438 | .438 | .438 |
|  | (.438) | (.438) | (.438) | (.438) | (.427) |
| DESM | .458 | .438 | .427 | .438 | .438 |
|  | (.438) | (.438) | (.416) | (.438) | (.438) |
| Size 25 |  |  |  |  |  |
| SE | .520 | .500 | .500 | .500 | .500 |
|  | (.490) | (.500) | (.490) | (.500) | (.490) |
| SESQ | .520 | .500 | .500 | .500 | .500 |
|  | (.490) | (.500) | (.490) | (.500) | (.490) |
| DESM | .520 | .500 | .479 | .500 | .500 |
|  | (.490) | (.500) | (.468) | (.490) | (.490) |

EXAMPLE IX

Compaction of uncored samples on a sliding sleeve to effect a double-ended simultaneous compaction, and compaction from one end only, provided an opportunity to measure the relative compaction forces generated with each method. In this respect, both of these methods involve a single and continuous movement of a compaction arm in one direction. Since single-ended sequential compaction involves an interrupted movement of the compaction arm, a similar comparison of this method to the method of the present invention could not be made.

In any event, the forces generated by the compaction arm when compacting uncored size 25 casing were measured. The graphs of these forces, as shown in FIG. 10, clearly show that for pack ratios greater than about 100, the double-ended simultaneous method exerts less force on the strand of casing than does the single-ended technique.

The graph shows a leveling off, and a temporary reduction of the compaction force at about 100 pounds. This can be attributed to the sleeve member beginning to slide responsive to the applied compaction force. During this time the pack ratio increases while the applied force remains substantially constant.

EXAMPLE X

Tests were also conducted using size 2½ and 4 of reinforced, or fibrous, casing. Size 2½ casing has an inflated diameter of about 2.4 inches and a wall thickness of about 0.0036 inches. Size 4 casing has a similar wall thickness and an inflated diameter of about 2.8 inches.

Strands of shirred casing were prepared using 200 foot lengths of each casing. These strands were then subjected to compaction by the single-ended compaction method and by the double-ended simultaneous compaction method, the latter utilizing a sliding sleeve as described hereinabove. Uncored, compacted strands prepared by each method were subjected to testing to determine the maximum compressed pack ratio.

It was found that the double-ended simultaneous compaction method produced a higher average pack ratio without pinhole damage than the conventional single-ended compaction method. For example, size 2½ casing compressed to a pack ratio of about 145 using the double-ended simultaneous method and to a pack ratio of about 137 with the single-ended compaction method. For size 4 casing the pack ratios for the two methods were about 171 and 166 respectively.

It was also found that fibrous casing subjected to double-ended simultaneous compaction maintained a larger bore size (per the drop fit test) after one week than the control method. For size 2½, the mean bore size of the samples was 1.543 inches for the double-ended simultaneous method as opposed to 1.518 inches for the control. For size 4 casing the mean bore sizes were 1.538 inches and 1.516 inches respectively.

EXAMPLE XI

Another compaction test was conducted with size 24 casing. This casing has an inflated diameter of about 0.81 inches, a wall thickness of about 0.001 inches and a moisture content of about 14 to 20% by total weight of the casing. This moisture content permits subsequent filling of the casing. Apparatus for this test was modified to use two compaction arms which were simultaneously moved against both ends of the casing as shown in FIG. 6. The mandrel shirring section of the apparatus was 0.520 inches in diameter and the compaction section was 0.480 inches in diameter.

The test was conducted specifically to confirm the benefit of the double-ended simultaneous method for making cored casing articles. The casing, after compaction, was transferred onto a core made of RPVC. This core was formed to an outside diameter of 0.466 inches and an inside diameter of 0.416 inches. RPVC was selected as the core material because of its higher creep strength as compared to HDPE, and because of its ability to withstand the radially inward forces exerted on the core as demonstrated in previous examples.

To effect a smooth transfer of the compacted casing to the core, the core was supported on an extension of the mandrel. The diameter of the extension was slightly less than the inside diameter of the core, and it thereby supported the core as the compressed casing was moved off of the 0.480 inch compaction section and onto the 0.466 inch core.

For purposes of comparison to the double-ended simultaneous method (DESM), control samples were made by moving the compaction arm in the following manners:

(a) against only a first end of the casing ($SE_1$),
(b) against only a second end of the casing ($SE_2$),
(c) against the first end and then the second ($SESQ_{1-2}$), and
(d) against the second end and then the first end ($SESQ_{2-1}$).

The limiting factor for compaction and transfer to the core was pinhole damage.

One goal of these tests was to maintain a final bore size of the cored casing article of at least 0.404 inches. This inside diameter was a goal because it is within the tolerance for the inside diameter of a conventional number 15 stuffing horn (0.468 inch OD × 0.406 inch ID) often used for stuffing conventional (uncored) shirred casing sticks of size 24 casing. Thus, by keeping the bore size of the casing article at about the same size as the inside diameter of the stuffing horn, the core of the article could function as the equivalent to a size 15 stuffing horn. Another goal was to produce a stick having a length not longer than about 21 inches, in order to have the stick fit a particular machine for stuffing frankfurter size casing.

For the DESM articles, 285 feet of casing was compressed to a pack ratio of about 180 and transferred to the core without pinhole damage. One week later, the pack ratio had dropped and stabilized at about 168.5 due to longitudinal expansion of the casing (a final stick length of about 20 inches). The inside or bore diameter of the core measured 0.404 inches which was within the tolerance for the bore size of a number 15 stuffing horn. In contrast, each of the SE and SESQ articles had pinhole damage when 285 feet of the casing was compressed to the pack ratio of 180.

For SE and SESQ articles, only about 252 feet of casing could be compacted and transferred to the core without pinhole damage. Moreover, the compacted pack ratio of about 159 dropped to about 151 after one week in a stick measuring about 20 inches long. This compared to the one week pack ratio of 168.5 for the DESM articles. The inside diameter of the core for both the SE and SESQ articles stabilized at about 0.406. While this was within acceptable limits and, in fact, was slightly larger than the bore of the DESM article, the DESM article contained over 30 feet more of casing. Assuming a nominal stick length of 21 inches for both cases, the pack ratios for the DESM and control articles were 163 and 144 respectively.

Examination and comparison of the DESM articles with the controls confirmed the findings of previous examples regarding the uniformity of pack ratio distribution. That is, the DESM article has, in general, a more uniform pack ratio over the length of the article.

This uniformity was demonstrated by subjecting the articles to a two variable regression analysis using the ordinary least squares method. Regression analysis and the ordinary least squares method are known methods of statistical analysis. A description of the methods can be found in McGraw Hill's "Schaum's Outlines, Statistics and Econometrics" (1982) by Dominick Salvatore.

In the analysis, the pack ratio was measured in each succeeding one inch segment along the stick. The pack ratio in each segment of the articles, as represented by an average of at least two articles, is given in Tables V and VI. These values (except for the extreme ends) were then subjected to the regression analysis.

TABLE V

| | Size 24 × 285' Cored | | | | |
|---|---|---|---|---|---|
| | SE 1 | SE 2 | SCSQ 1-2 | SESQ 2-1 | DESM |
| 1. | 157.26 | 166.48 | 176.44 | 166.74 | 169.33 |
| 2. | 138.97 | 165.91 | 175.37 | 154.35 | 149.42 |
| 3. | 145.33 | 160.34 | 170.72 | 159.00 | 160.11 |
| 4. | 146.79 | 164.41 | 178.88 | 157.98 | 163.07 |
| 5. | 149.56 | 154.82 | 176.82 | 165.76 | 155.17 |
| 6. | 150.64 | 167.17 | 174.88 | 166.95 | 158.81 |
| 7. | 149.98 | 159.12 | 176.72 | 163.29 | 155.40 |
| 8. | 156.28 | 154.96 | 172.64 | 157.37 | 152.20 |
| 9. | 159.18 | 162.79 | 172.87 | 168.74 | 164.04 |
| 10. | 160.64 | 155.31 | 171.54 | 171.04 | 154.29 |
| 11. | 152.11 | 157.87 | 163.74 | 167.56 | 164.65 |
| 12. | 159.71 | 167.09 | 169.41 | 164.67 | 156.29 |
| 13. | 167.53 | 154.27 | 174.48 | 176.54 | 160.46 |
| 14. | 168.97 | 157.39 | 165.77 | 175.66 | 172.31 |
| 15. | 159.14 | 148.07 | 162.67 | 166.63 | 171.96 |
| 16. | 160.76 | 154.81 | 158.38 | 165.11 | 157.20 |
| 17. | 166.84 | 148.86 | 162.93 | 181.37 | 161.44 |
| 18. | 166.09 | 153.72 | 166.85 | 168.83 | 151.63 |
| 19. | 158.66 | 147.85 | 153.93 | 167.81 | 163.94 |
| 20. | 157.57 | 142.52 | 128.78 | 140.30 | 146.25 |
| 21. | 97.63 | 97.63 | | | 96.77 |

TABLE VI

| | Size 24 × 252' Cored | | | | |
|---|---|---|---|---|---|
| | SE 1 | SE 2 | SESQ 1-2 | SESQ 2-1 | DESM |
| 1. | 141.76 | 165.88 | 162.60 | 142.70 | 156.39 |
| 2. | 123.98 | 157.44 | 154.32 | 136.07 | 132.98 |
| 3. | 135.09 | 153.42 | 158.72 | 137.44 | 143.15 |
| 4. | 134.80 | 157.46 | 159.51 | 142.88 | 134.90 |
| 5. | 134.54 | 153.20 | 155.82 | 138.71 | 144.47 |
| 6. | 134.94 | 144.04 | 154.56 | 141.32 | 133.76 |
| 7. | 129.96 | 153.18 | 150.89 | 136.79 | 137.86 |
| 8. | 138.25 | 145.84 | 149.98 | 142.36 | 130.62 |
| 9. | 130.02 | 144.87 | 149.36 | 136.78 | 136.40 |
| 10. | 140.11 | 150.98 | 153.23 | 144.99 | 139.61 |
| 11. | 139.00 | 143.80 | 146.64 | 149.87 | 136.19 |
| 12. | 145.44 | 143.45 | 142.94 | 153.12 | 133.53 |
| 13. | 143.17 | 142.82 | 147.80 | 146.38 | 134.92 |
| 14. | 144.81 | 143.01 | 144.31 | 146.50 | 132.58 |
| 15. | 146.33 | 146.26 | 139.90 | 154.09 | 134.73 |
| 16. | 134.83 | 133.46 | 140.00 | 144.27 | 133.59 |
| 17. | 151.35 | 137.95 | 141.18 | 149.01 | 131.80 |
| 18. | 139.43 | 139.55 | 136.33 | 153.89 | 130.52 |
| 19. | 142.89 | 134.54 | 140.23 | 146.49 | 134.49 |
| 20. | 139.40 | 132.21 | 105.72 | 126.77 | 127.29 |
| 21. | 106.98 | 86.83 | | | 110.22 |

The analysis showed that the variation of pack ratio along the length of the stick as represented by the slope of the regression or "best fit" line was flatter for the DESM articles than for the controls. In fact, the pack ratio was so uniform along the length of the DESM articles, that the absolute value of the slope of the regression line was less than about 0.5. Table VII gives the slope values for each of the articles.

TABLE VII

| Regression Line Slope for Cored Articles | | |
|---|---|---|
| | Size 24 × 285' | Size 24 × 252' |
| $SE_1$ | 1.147 | 0.791 |
| $SE_2$ | −0.921 | −1.221 |
| $SESQ_{1-2}$ | −1.061 | −1.241 |
| $SESQ_{2-1}$ | 0.864 | 0.848 |
| DESM | 0.128 | −0.429 |

A similar regression analysis for the uncored article of Example VII had the results as shown in table VIII.

TABLE VIII

| | Regression Line Slope for Uncored Articles | |
|---|---|---|
| | Size 21 × 200′ | Size 25 × 200′ |
| SE | −0.776 | −1.016 |
| SESQ | −0.308 | −0.549 |
| DESM | 0.139 | −0.091 |

Thus for the uncored DESM article the absolute value of the slope was less than about 0.200 in each case.

Examination of the cored casing articles also confirmed that, in general, the pack ratio at the extreme ends of the casing stick is lower than the pack ratio at points elsewhere along the stick. Stick growth for the cored or CHD articles is not as dramatic as the growth of uncored casing articles due to the resistance to such growth offered by the frictional engagement of the casing and the core. However, the extreme ends of the compacted casing in both cases were ignored when conducting the regression analysis.

Examination of these cored articles also established that for like casing lengths compacted to the same pack ratio and transferred, the DESM article has a more uniform outside diameter than the controls. This is illustrated in Table IX which gives the diameter in inches at the ends and middle of various articles.

A uniform outside diameter is desirable from the stand point of packaging the casing articles for shipment. A uniform outside diameter makes it easier to package the articles in a stacked array as opposed to casing articles which are larger in diameter at one end or another.

TABLE IX

| | Casing Stick Outer Diameter, Inches | | |
|---|---|---|---|
| | 1st end | middle | 2nd end |
| (Article contains 285′ of casing; compacted pack ratio of 180) | | | |
| SE$_1$ | 0.950 | 0.980 | 0.986 |
| SE$_2$ | 0.982 | 0.986 | 0.968 |
| SESQ$_{1-2}$ | 0.992 | 0.990 | 0.960 |
| SESQ$_{2-1}$ | 0.966 | 1.000 | 0.988 |
| DESM | 0.986 | 0.991 | 0.984 |
| (252 feet of casing; compacted pack ratio of 159) | | | |
| SE$_1$ | 0.951 | 0.966 | 0.970 |
| SE$_2$ | 0.965 | (not measured) | 0.945 |
| DESQ$_{1-2}$ | 0.956 | ″ | 0.965 |
| DESQ$_{2-1}$ | 0.948 | ″ | 0.976 |
| DESM | 0.956 | .958 | 0.952 |

Any increase in the core outside diameter would increase the inside diameter of the compacted casing on the core. Thus, for a given casing size, decreasing the inside diameter of the core to the diameter equivalent of a smaller stuffing horn would result in an increase in the pack ratio of both the DESM and the cored casing articles of the controls (assuming the core outside diameter was decreased accordingly). Conversely, increasing the bore size (and the core outside diameter) to the equivalent of a larger stuffing horn decreases the pack ratio.

EXAMPLE XII

Figure 11:
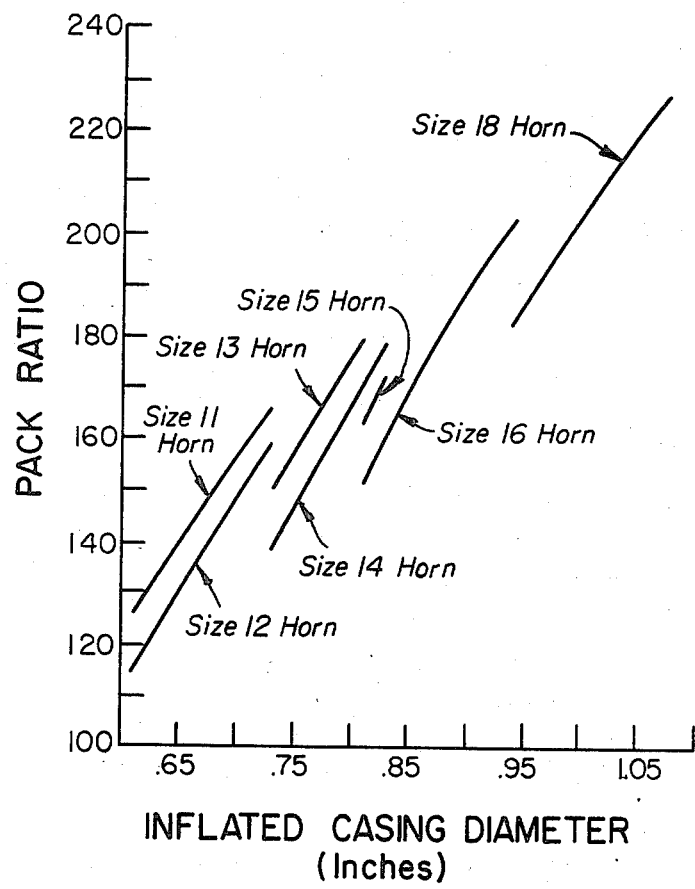
FIG. 11 is a graph showing the relationship between casing sizes, pack ratio and bore diameters for an improved cored high density casing article of the present invention.
Figure 12:
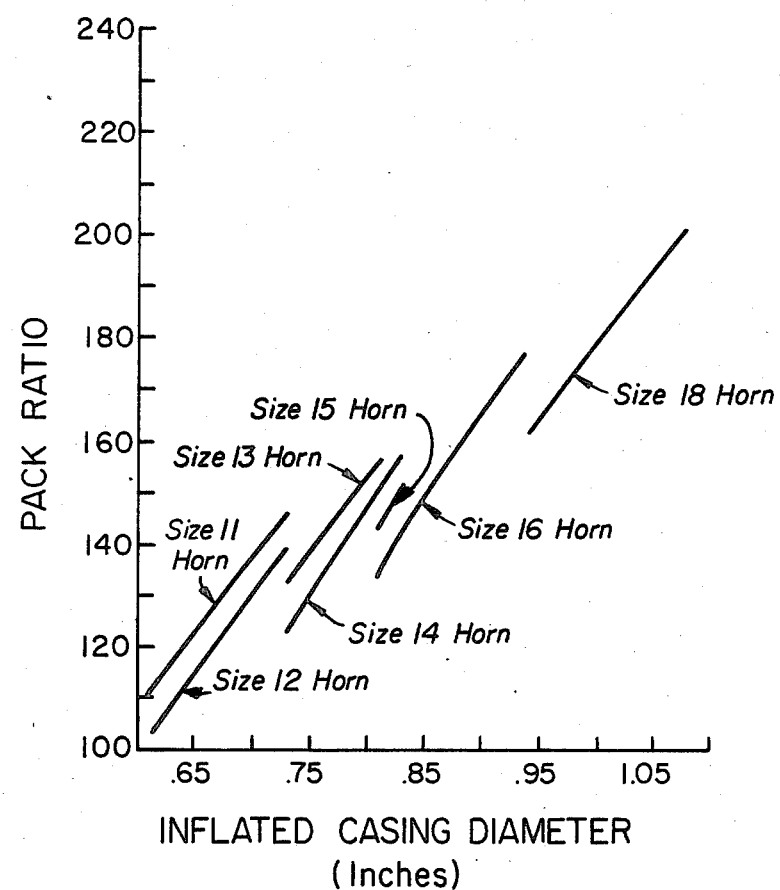
FIG. 12 is similar to FIG. 11 only showing the same relationships in cored high density casing articles not made by the double ended simultaneous compaction method.

Using, in a computer model, data from the previous Example XI as to casing size (0.81 inch inflated diameter), stuffing horn size (0.406 inch inside diameter) and pack ratio (163 for DESM and 144 for the controls), corresponding values of pack ratio were computed for various other standard casing and stuffing horn sizes. The results of such computations are shown in the graphs of FIGS. 11 and 12 and in Tables X and XI. The numerical values indicated are considered to be representative of the actual values that may be obtained for DESM articles per the present invention and for articles made by the control methods. It should be appreciated that the pack ratios listed for the control articles represent the optimum values that applicant considers obtainable in these articles and that each corresponding DESM casing article as per the present invention has a higher pack ratio. For example, a DESM article of Table X and FIG. 11, composed of the same casing and having a core of the same bore diameter (stuffing horn inside diameter) and wall thickness as any control article of Table XI and FIG. 12, would have a higher overall pack ratio of casing length to casing stick length. Moreover, the DESM article also would have a pack ratio in any one inch segment over its length which is higher and more uniform than the comparable control article.

To use the graphs, the desired casing size is selected along the horizontal axis. Reading upward from this point to the line representing the desired bore size, and then reading across to the vertical axis will indicate the pack ratio that can be obtained. Thus, for any given casing size (inflated diameter), the graphs and tables indicate a range of bore diameters equivalent to various stuffing horn sizes that may be selected for use with that casing and the pack ratio attainable for any given combination of casing, and desired bore size.

Comparison of these tables and graphs, for both the double-ended simultaneous method and the other methods tested, illustrates the advantage of using double-ended simultaneous compaction for cored articles. In this respect, the casing articles per the invention will obtain and maintain over time, a relatively high pack ratio per given casing and desired bore size. The higher pinhole free pack ratio translates to longer casing lengths per article than is attainable with other methods.

TABLE X

| | | Pack Ratio of DESM | | | | | | |
|---|---|---|---|---|---|---|---|---|
| | INFL | HORN SIZE (I.D. in inches) | | | | | | |
| Casing Size | DIA IN inches | 11 (.281) | 12 (.313) | 13 (.344) | 14 (.375) | 15 (.406) | 16 (.438) | 18 (.500) |
| 17 | .61 | 126 | 115 | | | | | |
| 21 | .73 | 166 | 159 | 150 | 139 | | | |
| 24 | .81 | | | 179 | 170 | 163 | 152 | |
| 25 | .83 | | | | 179 | 172 | 162 | |
| 28 | .94 | | | | | | 202 | 183 |

TABLE XI

Pack Ratio of Controls - SESQ & SE

| Casing Size | INFL DIA IN inches | HORN SIZE (I.D. in inches) | | | | | | |
|---|---|---|---|---|---|---|---|---|
| | | 11 (.281) | 12 (.313) | 13 (.344) | 14 (.375) | 15 (.406) | 16 (.438) | 18 (.500) |
| 17 | .61 | 111 | 102 | | | | | |
| 21 | .73 | 147 | 140 | 133 | 123 | | | |
| 24 | .81 | | | 157 | 151 | 144 | 134 | |
| 25 | .83 | | | | 158 | 152 | 143 | |
| 28 | .94 | | | | | | 178 | 162 |

Thus, it should be appreciated that the present invention provides a shirred casing article having a number of desirable and identifiable characteristics. For example, the article has a higher pack ratio for a given casing size and article bore diameter; it has an identifiable relatively uniform pack ratio and outside diameter end-to-end than other shirred and compacted casing articles; and it contains a length of pinhole free casing which is longer than that found in casing articles of comparable casing size and bore diameter.

Having thus described the invention in detail, what is claimed as new is:

1. A casing article comprising:
   (a) a tubular core having a bore which is a size that is at least equivalent to the inside diameter of a stuffing horn selected from a range of stuffing horns used for filling a certain size of cellulosic casing; and
   (b) a compressed casing stick on said core, said stick containing at least 200 feet of a moisturized, substantially pinhole-free, length of said certain size of cellulosic casing, shirred and longitudinally compacted to such a degree that said compressed casing stick embraces and exerts inward forces on said tubular core, said core being sufficiently rigid to resist said forces so as to maintain a bore diameter no less than the equivalent inside diameter of a said stuffing horn;
   (c) said compressed casing stick having in substantially any one inch segment of stick length over substantially the full length of said stick a pack ratio of casing length to segment length of at least 100; and
   (d) said pack ratio being substantially uniform over the length of said stick such that the variation of pack ratio along the length of said stick in successive one inch segments thereof is represented by a straight line as calculated by the least squares method, whose slope has an absolute value of less than about 0.500.

2. A casing article as in claim 1 wherein said core has a bore diameter of at least about 0.281 inches and said cellulosic casing has an inflated diameter of about 0.61 inches and, wherein said casing stick has both an overall pack ratio and a pack ratio in any of said segments of at least about 102.

3. A casing article as in claim 1 wherein said core has a bore diameter of at least about 0.281 inches and said cellulosic casing has an inflated diameter of about 0.73 inches and, wherein said casing stick has both an overall pack ratio and a pack ratio in any of said segments of at least about 123.

4. A casing article as in claim 1 wherein said core has a bore diameter of at least about 0.344 inches and said cellulosic casing has an inflated diameter of about 0.81 inches and, wherein said casing stick has both an overall pack ratio and a pack ratio in any of said segments of at least about 134.

5. A casing article as in claim 1 wherein said core has a bore diameter of at least about 0.375 inchs and said cellulosic casing has an inflated diameter of about 0.83 inches, and wherein said casing stick has both an overall pack ratio and a pack ratio in any of said segments of at least about 143.

6. A casing article as in claim 1 wherein said core has a bore diameter of at least about 0.438 inches and said cellulosic casing has an inflated diameter of about 0.94 inches, and wherein said casing stick has both an overall pack ratio and a pack ratio in any of said segments of at least about 162.

7. A compacted shirred tubular casing stick having a drop-fit diameter of between about 0.416 and about 0.500 inches, said stick containing about 200 feet of cellulosic casing which is substantially pinhole free and which has an inflated diameter of between about 0.73 inches and about 0.83 inches and a wall thickness of about 0.001 inches, and said stick having a pack ratio which is at least about 113 in any one inch segment of its length over substantially the full length of said stick, and said pack ratio being so uniform over the length of said stick that the variation of pack ratio along the length of said stick in successive one inch segments thereof is represented by a straight line as calculated by the least squares method, whose slope has an absolute value of less than about 0.200.

* * * * *

UNITED STATES PATENT AND TRADEMARK OFFICE
CERTIFICATE OF CORRECTION

PATENT NO. : 4,690,173

DATED : September 1, 1987

INVENTOR(S) : Algimantas P. Urbutis

It is certified that error appears in the above—identified patent and that said Letters Patent is hereby corrected as shown below:

In col. 2, line 10, delete the word "a".

In col. 4, line 4, change "peats" to -- pleats --.

In col. 4, line 11 change "retrained" to -- restrained --.

In col. 7, line 13, after "compacting" add -- steps --.

In col. 11, line 14, change "0.053" to -- 0.53 --.

In col. 17, line 22, change "patios" to -- ratios --.

Signed and Sealed this

Twenty-sixth Day of July, 1988

Attest:

DONALD J. QUIGG

Attesting Officer      Commissioner of Patents and Trademarks